March 27, 1928.
S. SICARD
DEVICE FOR STRETCHING AND FASTENING HOOPS FOR BOXES AND THE LIKE
Filed Nov. 9, 1925
1,663,616
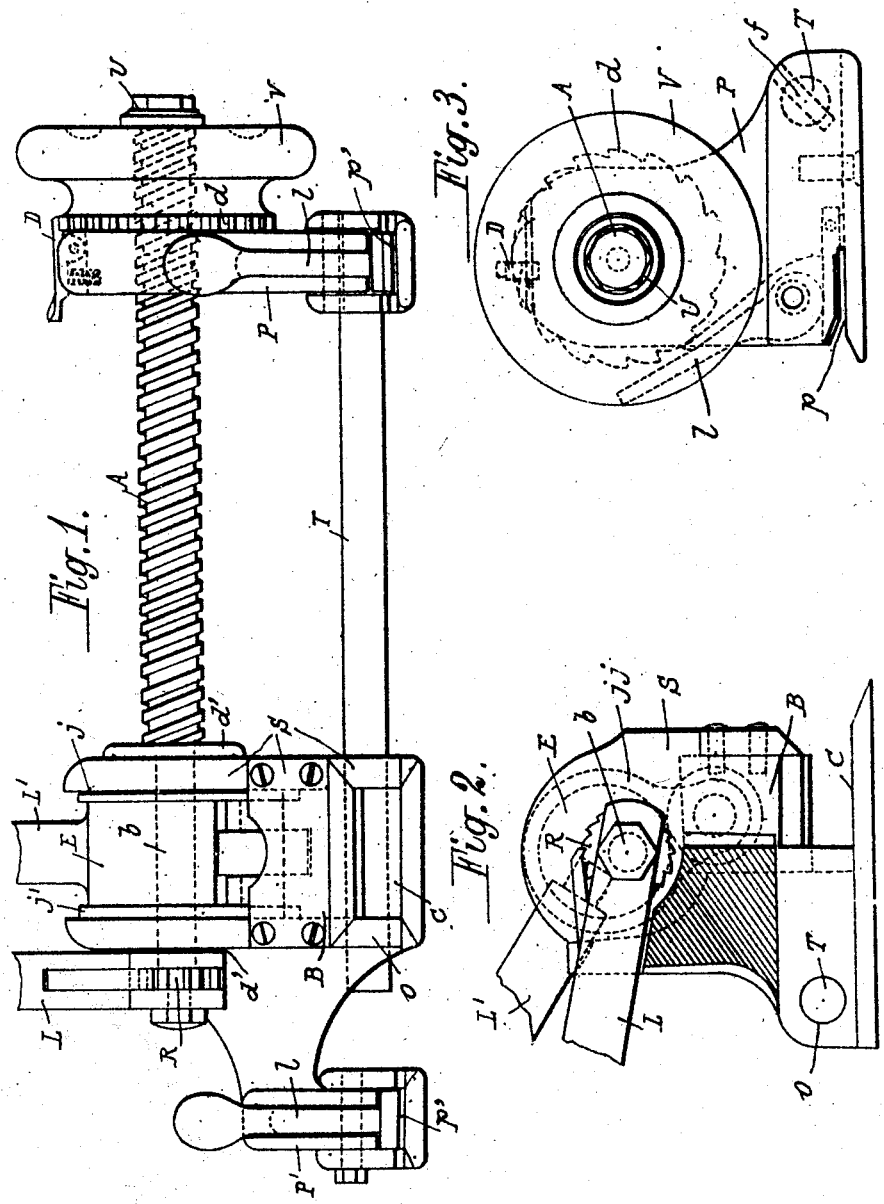
Inventor
S. Sicard Patented Mar. 27, 1928.

1,663,616

UNITED STATES PATENT OFFICE.

SÉRAPHIN SICARD, OF PARIS, FRANCE, ASSIGNOR OF FIFTY PER CENT TO M. ANDRÉ REBICHON, OF PARIS, FRANCE.

DEVICE FOR STRETCHING AND FASTENING HOOPS FOR BOXES AND THE LIKE.

Application filed November 9, 1925, Serial No. 68,036, and in France November 22, 1924.

This invention relates to a device for stretching and fastening hoops for boxes and the like.

According to this invention I provide a device of the kind referred to above wherein a stretching device and a fastening device are mounted on a single rotatable shaft, the arrangement being such that the tensioning operation can be carried out by rotating the shaft by means of a ratchet or other device or by a wheel rotatably mounted on said shaft and adapted to move a gripping device, for one end of the hoop, axially along said shaft, whereby the device can be rapidly returned to its original position after its operation. The shaft and wheel may be screw-threaded and the gripping device carried by a plate or the like guided by said shaft and by a rod slidable through the fastening device.

The fastening device may be fixed against lateral movement and may carry a gripping device for the other end of the hoop, said fastening device comprising a slidable fastening block adapted to be actuated to carry out the fastening operation by means of eccentrics mounted on said shaft.

One constructional form of this invention is illustrated, by way of example, on the annexed drawing, whereon:

Fig. 1 is a front view of the device, and Figs. 2 and 3 are end views thereof.

Referring to the drawings:—

A screw-threaded shaft A is formed with a plain cylindrical part $b$ passing through a fastening device S and serving as the axis of an eccentric E fixed on said part, a ratchet wheel R being also fixed to the latter. The shaft A is rotatable and side play thereof is eliminated on each side of the fastening device S at $d$ and $d'$. The other end of the shaft passes through a gripper-carrying plate P hereinafter termed the stretching device which is freely movable laterally and is guided by means of a round rod T fixed at one end to the plate P at $f$ and slidable at the other end through an opening O in the fastening device S.

The displacement of the stretching device P along the shaft A for tensioning the hoop-iron is carried out by means of the threaded wheel V. The gripper device for receiving the other end of the hoop-iron is arranged on the opposite side of the fastening device S at P' and is solid with the block of the fastening device S.

In order to operate the device, one of the ends of the hoop-iron is arranged in the gripper P', in such a manner that the hoop-iron may also be engaged in the fastening device S. The hoop-iron is passed round the box and held at a suitable distance from its other end by the stretching device P. The two locking levers $l$ and $l'$ are then pulled downwards. The hoop-iron is stretched by rotating the wheel V, which latter pushes the guided plate P before it. The lever L is turned simultaneously (or alone) in the reverse direction to the locking rotation of the threaded-wheel V, the latter being checked in order to prevent its return backwards under the action of the lever L, by a spring-pressed pawl D engaging in a toothed part $d$ of the wheel. The lever L serves to not only prevent independent rotation of the threaded shaft A but in the movement of said lever reverse to the operative movement of the wheel V, accelerates the movement of said wheel. When the hoop-iron is stretched the fastener therefor is arranged at C and the lever L' of the fastening device is operated, whereupon the block B of the fastening device, which block is operated through the movement of the eccentric E to clamp the fastener about the hoop ends, raised after its previous operation by the lever L' and the eccentric cheeks $j$ and $j'$, is caused to descend. The two levers $l$ and $l'$ are then raised and the hooping device withdrawn by sliding it to the rear.

In order to set the device for its next operation the wheel V is rapidly rotated, and only comes to rest quickly in its rear position by abutting against a stop nut U arranged at the end of the screwed shaft A. Finally the plate P is slid backwards until it abuts against the wheel V.

It will also be understood that the tool mounted on the fastening device S is adapted to the requirements of the fastener employed and that the grippers $p$ and $p'$ can be varied.

I claim:

1. A device for stretching and fastening hoops for boxes and the like, comprising a stretching device, a fastening device, a single rotatable shaft on which said devices are mounted, a ratchet on the shaft, means cooperating with the ratchet whereby the shaft may be rotated for the tensioning operation, and means whereby the stretching device may be freed from cooperation with the shaft to permit relatively free movement of said stretching device axially of the shaft following the operation of such device.

2. A device as claimed in claim 1, wherein the shaft and stretching device are mounted for cooperative screw threaded movement and the movement of the stretching device is guided in the fastening device.

3. A device as claimed in claim 1, wherein the fastening device is fixed against lateral movement on the shaft, and a gripping device carried by said fastening device, the said fastening device including an eccentric mounted on the screw threaded shaft for the fastening operation.

4. A device as claimed in claim 1, wherein the fastening device is fixed against axial movement on the shaft and is disposed between two stretching devices, one of which is movable axially of the shaft.

Signed at Paris, Seine, France, this twenty-eighth day of October, 1925.

SÉRAPHIN SICARD.